Jan. 30, 1968 S. PAPETTI 3,366,658
SILICON CONTAINING ORGANOBORANES AND PROCESS THEREFOR
Filed Sept. 20, 1963

*FORMULA I*

○ BORON
⊛ CARBON
⊕ SILICON
⊘ CHLORINE
○ HYDROGEN ON CARBON
(HYDROGEN ON BORON
OMITTED FOR CLARITY)

INVENTOR.
STELVIO PAPETTI
BY Walter D. Hunter
AGENT

United States Patent Office 3,366,658
Patented Jan. 30, 1968

3,366,658
SILICON CONTAINING ORGANOBORANES
AND PROCESS THEREFOR
Stelvio Papetti, Hamden, Conn., assignor to Olin Mathieson Chemical Corporation, a corporation of Virginia
Filed Sept. 20, 1963, Ser. No. 310,423
15 Claims. (Cl. 260—448.2)

ABSTRACT OF THE DISCLOSURE

Cyclic silicon-containing organoboranes are prepared by reacting carborane or a substituted carborane successively with an alkali metal alkyl or aryl and a bis(haloalkylsilyl) carborane, such as bis(dichloromethylsilyl) carborane at a temperature of from about −90° C. to about +50° C. The reaction is conducted in the presence of an inert solvent which can be benzene, toluene, etc.

---

Figure 1:
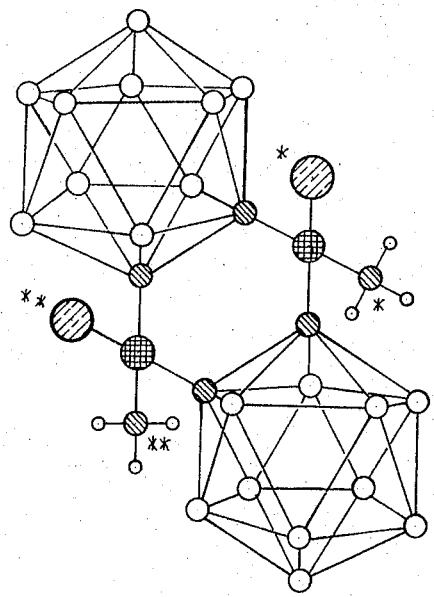

The invention relates to silicon-containing organoboranes and to a process for their preparation.

The novel compounds of this invention have the formula:

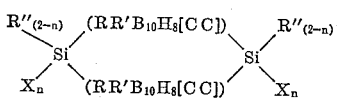

wherein R and R′ are selected from the group consisting of hydrogen and an alkyl radical having from 1 to 5 carbon atoms, R″ is selected from the group consisting of an alkyl radical having from 1 to 5 carbon atoms, X is a halogen selected from the group consisting of chlorine, bromine and iodine and $n$ is an integer of from 0 to 2 inclusive.

In preparing the silicon-containing compounds of this invention a carborane compound of the class:

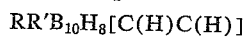

wherein R and R′ are selected from the group consisting of hydrogen and an alkyl radical containing from 1 to 5 carbon atoms, is reacted successively with an alkali metal alkyl or aryl and a silicon-containing compound of the formula:

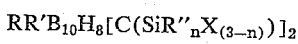

wherein R and R′ are each selected from the group consisting of hydrogen or an alkyl radical having 1 to 5 carbon atoms, R″ is selected from the group consisting of an alkyl radical having 1 to 5 carbon atoms, X is a halogen selected from the group consisting of chlorine, bromine and iodine and $n$ is an integer of from 0 to 2 inclusive.

Silicon-containing compounds useful as starting materials in the process of this invention can be prepared according to the method described in Papetti application Ser. No. 310,379; filed Sept. 20, 1963. For example, the compound bis(chloro dimethylsilyl) carborane which has the formula:

can be prepared by slowly adding at ice-bath temperature a slurry prepared by reacting butyl lithium and carborane, ($B_{10}H_{10}[C(H)C(H)]$) at a temperature of 0° C. to a stirred solution of dichloro dimethylsilane in diethyl ether. Suitable silicon-containing compounds include bis(dichloro methylsilyl)carborane bis(trichlorosilyl) carborane, bis (dichloro ethylsilyl) carborane, bis(chloro di-n-propylsilyl) carborane, bis(chloro-diisoamylsilyl) carborane, etc. and the corresponding bromine and iodine derivatives.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical chemical properties. Propellants produced by the methods described in this application burn uniformly without disintegration when ignited by conventional means, such as a pyrotechnic type igniter, and are mechanically strong enough to withstand ordinary handling.

The reaction is carried out in the presence of an inert organic solvent which can be benzene, toluene, xylene, petroleum ether, dioxane, tetrahydrofuran, etc. The lower dialkyl ethers such as diethyl ether, ethyl methyl ether, di-n-propyl ether, diisobutyl ether, diamyl ether, etc. are especially useful solvents in this process.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like since they are soluble in the inert organic solvents employed. Other alkali metal alkyls such as sodium and potassium, can also be employed as can the alkali metal aryls including phenyl lithium.

Compounds of the above class can be prepared by the reaction of decaborane or an alkylated decaborane having 1 to 2 alkyl groups containing 1 to 5 carbon atoms in each alkyl group with an acetylenic hydrocarbon containing from 2 to 10 carbon atoms in the presence of a wide variety of ethers, nitriles or amines. The preparation of these compounds is described in application Ser. No. 741,967, filed June 13, 1958 of Ager, Heying and Mangold, now abandoned. For example, the compound carborane ($B_{10}H_{10}[C(H)C(H)]$) can be prepared by reacting for about 12 hours at 125° C. a mixture of decaborane and tetrahydrofuran in an autoclave pressured to 100 p.s.i. with acetylene.

The preparation of decaborane is known in the art. Lower alkyls of decaborane such as monomethyldecaborane, dimethyldecaborane, monoethyldecaborane, diethyldecaborane, monopropyldecaborane and the like, can be prepared, for example, according to U.S. Patent 2,999,-117 of Altwicker, Garrett, Weilmuenster and Harris.

In the first stage of the process the ratio of the reactants can be varied widely, generally being within the range of from about 2.0 to about 10 moles or more of the alkali metal alkyl or aryl per mole of the carborane compound employed and preferably in the range of from about 2 to about 5 moles of the alkali metal alkyl or aryl per mole of the carborane compound utilized. Although atmospsheric pressure reactions are convenient, subatmospheric pressures up to pressures of about +5 atmospheres or more can be employed.

The reaction of the alkali metal alkyl or aryl is substantially instantaneous. In order to prevent overheating, the slow addition of the alkali metal alkyl or aryl compound to the reaction mixture is practiced.

The amount of the silicon-containing organoborane employed in the second stage of the novel process of this invention can also be varied widely and generally will be from about 0.5 to about 2.0 or more moles per mole of the carborane compound added to the reactor in the initial step. The pressure employed in the second phase of the reaction can be varied widely, although atmospheric pressure reactions are convenient.

In general the reaction temperature (overall) will vary from about −90° to about +50° C. with the preferred temperature being about −50° to about +40° C.

The reaction time (total) will vary from about 0.5 to about 24 hours or more depending upon the reaction conditions employed.

Recovery of the products of this invention can be accomplished in a variety of ways such as by first filtering off the alkali metal chloride formed during the reaction followed by evaporation of the filtrate to dryness to give the crude product. Recrystallization from acetone, benzene or hexane etc. yields the pure product.

The structural formula of Compound A is shown as Formula I in FIGURE 1.

The structural formula of Compound B is the same as structural Formula I in FIGURE 1 with the exception that the two Cl substituents designated by the single and double asterisks are each replaced by a $CH_3$ group.

The structural formula of Compound C is the same as structural Formula I in FIGURE 1 with the exception that the two $CH_3$ groups designated by the single and double asterisks are each replaced by Cl.

This invention is illustrated in detail by the following examples which are to be considered not limitative.

In the examples the term "moles" signifies "gram moles."

Example I

A dilithiocarborane, slurry in ether, prepared from 10.2 g. (0.071 mol.) of carborane and 0.149 mole of butyllithium in diethyl ether, was added to a cooled solution of 0.0782 mole of bis(dichloro methylsilyl) carborane in ether. The mixture was refluxed overnight and then filtered. Then the residue was extracted with several portions of benzene, the combined extracts were evaporated to dryness and the resulting solid was recrystallized from benzene (6.4 g.). The filtrate from the original reaction was concentrated and the solid which formed was removed and recrystallized from petroleum ether (B.P. 65°–110° C.) (2.0 g.). All mother liquors were combined, evaporated to dryness and this residue was recrystallized from 65–110° C. petroleum ether (B.P. 65°–110° C.) (7.3 g.). All three materials were shown to be identical and the combined weight corresponded to a 51 percent yield of Compound A, M.P. 281–283° C.

*Analysis.*—Calc'd for $C_6H_{26}B_{20}Cl_2Si_2$: C, 16.32; H, 5.94; B, 49.0; Cl, 16.06; Si, 12.72. Found: C, 16.22; H, 5.96; B, 49.11; Cl, 16.5, 16.2; Si, 12.8, 12.4.

The formula of Compound A is:

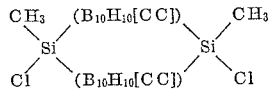

Example II

A dilithiocarborane, slurry in ether, prepared by reacting 7.5 g. (0.052 mol.) of carborane and 0.109 mole of butyllithium in diethyl ether, was added to a cooled solution of 0.11 mol. of bis(chloro dimethylsilyl) carborane in ether. The mixture was refluxed overnight, filtered and the filtrate evaporated to dryness. This residue was heated at 130–140° C. in vacuo to remove the unreacted carborane compound. The residue was recrystallized from acetone to give a 23 percent (based on the original amount of bis(chloro dimethylsilyl) carborane added to the reactor) yield of Compound B, M.P. 309–310° C.

*Analysis.*—Calc'd for $C_8H_{32}B_{20}Si_2$: C, 23.97; H, 8.05; B, 53.97; Si, 14.01; M.W., 400. Found: C, 22.95; H, 7.78; B, 53.84; Si, 14.42; M.W., 379 (osmometric).

The formula of Compound B is:

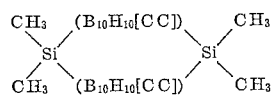

Example III

Bis(trichlorosilyl) carborane (0.484 g., 0.0118 mol.) in 50 ml. of ether was allowed to react with dilithiocarborane prepared by reacting 1.550 g. (0.0107 mol.) of carborane and 2.26 moles of butyl lithium in diethyl ether. The reaction was refluxed overnight and then filtered. The residue was extracted several times with ether and the combined extracts were evaporated to dryness. This solid was recrystallized from benzene (2.0 g.). The filtrate from the original reaction was concentrated and the solid which formed was removed and recrystallized from benzene (0.5 g.). All mother liquors were combined, evaporated to dryness and the resulting solid was also recrystallized from benzene (0.2 g.). All three materials were shown to be identical and the combined weight represented a 52.2 percent yield of Compound C, M. P. 271–272° C.

*Analysis.*—Calc'd for $C_4H_{20}B_{10}Cl_4Si_2$: C, 9.95; H, 4.18; Cl, 29.39. Found: C, 9.74; H, 4.11; Cl, 29.7.

By mass spectral analysis the product was also identified as Compound C in greater than 98 percent purity.

The formula of Compound C is:

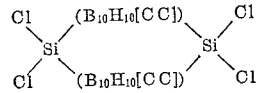

The solid silicon-containing organoboron compounds produced by practicing the process of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided silicon-containing organoboron compound can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. Silicon-containing organoboranes of the formula:

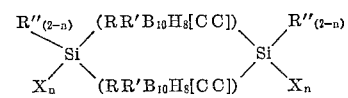

wherein R and R' are each selected from the group consisting of hydrogen and an alkyl radical having 1 to 5 carbon atoms, R" is selected from the group consisting of an alkyl radical having from 1 to 5 carbon atoms, X is a halogen selected from the group consisting of chlorine, bromine and iodine and n is an integer of from 0 to 2 inclusive.

2. 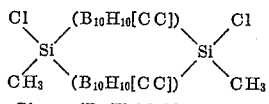

3. 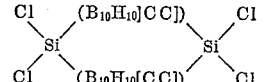

4. 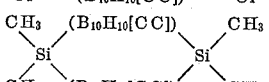

5. A process for the preparation of silicon-containing organoboranes which comprises reacting a carborane compound of the formula:

$$RR'B_{10}H_8[C(H)C(H)]$$

wherein R and R' are each selected from the group consisting of hydrogen and an alkyl radical having 1 to 5 carbon atoms, successively with at least two moles of an alkali metal alkyl or aryl per mole of carborane compound and a silicon-containing compound of the formula:

$$RR'B_{10}H_8[C(SiR''_nX_{(3-n)})]_2$$

wherein R and R' are each selected from the group consisting of hydrogen and an alkyl radical having 1 to 5 carbon atoms, R'' is an alkyl radical having 1 to 5 carbon atoms, X is a halogen selected from the group consisting of chlorine, bromine and iodine and n is an integer of from 0 to 2 inclusive, said successive reactions being carried out in the presence of an inert organic solvent.

6. The process of claim 5 wherein the successive reactions are carried out at a temperature within the range of from about —90° to +50° C.

7. The process of claim 5 wherein the said carborane compound is $B_{10}H_{10}[C(H)C(H)]$.

8. The process of claim 5 wherein the said alkali metal alkyl is butyl lithium.

9. The process of claim 5 wherein the said inert organic solvent is diethyl ether.

10. The process of claim 5 wherein the said silicon-containing compound is bis(dichloro methylsilyl) carborane.

11. The process of claim 5 wherein the silicon-containing compound is bis(chloro dimethylsilyl) carborane.

12. The process of claim 5 wherein the silicon-containing compound is bis(trichlorosilyl) carborane.

13. The process for the preparation of the compound:

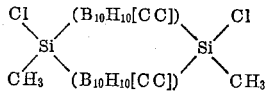

which comprises reacting $B_{10}H_{10}[C(H)C(H)]$ successively with at least two moles per mole of carborane of butyl lithium and bis(dichloro methylsilyl) carborane in the presence of diethyl ether and at a temperature of from about —90° to about +50° C.

14. The process for the preparation of the compound:

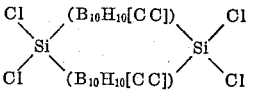

which comprises reacting $B_{10}H_{10}[C(H)C(H)]$ successively with at least two moles per mole of carborane of butyl lithium and bis(trichlorosilyl) carborane in the presence of diethyl ether and at a temperature of from about —90° to about +50° C.

15. The process for the preparation of the compound:

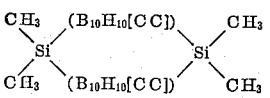

which comprises reacting $B_{10}H_{10}[C(H)C(H)]$ successively with at least two moles per mole of carborane of butyl lithium and bis(chloro dimethylsilyl) carborane in the presence of diethyl ether and at a temperature of from about —90° to +50° C.

References Cited

UNITED STATES PATENTS

| | | | |
|---|---|---|---|
| 2,386,452 | 10/1945 | Fleming | 260—448.2 |
| 2,927,004 | 3/1960 | Girardot | 260—448.2 |
| 2,974,157 | 3/1961 | Jex | 260—448.2 |
| 3,137,734 | 6/1964 | Cox et al. | 260—606.5 |

TOBIAS E. LEVOW, *Primary Examiner.*

HELEN M. McCARTHY, *Examiner.*

P. F. SHAVER, *Assistant Examiner.*